United States Patent [19]

Schjeldahl

[11] 4,157,767
[45] Jun. 12, 1979

[54] BAIL SEPARATOR FOR NESTED CONTAINERS

[76] Inventor: Gilmore T. Schjeldahl, 4436 Marlborough Ct., Minnetonka, Minn. 55343

[21] Appl. No.: 870,423

[22] Filed: Jan. 18, 1978

[51] Int. Cl.² .................................................. B65G 59/06
[52] U.S. Cl. ...................................... 221/211; 221/251
[58] Field of Search ............... 221/211, 251, 223, 221, 221/299, 300, 251; 214/8.5 C, 8.5 D, 8.5 K

[56] References Cited

U.S. PATENT DOCUMENTS

| | | | |
|---|---|---|---|
| 3,795,346 | 3/1974 | Roberts et al. | 221/223 |
| 4,082,203 | 4/1978 | Schjeldahl | 221/251 |

*Primary Examiner*—Allen N. Knowles
*Attorney, Agent, or Firm*—Orrin M. Haugen; Thomas J. Nikolai

[57] ABSTRACT

Apparatus for separating and delivering individual box-line containers from a stacked column of nested box-like containers, each container having an upper rim and an outwardly projecting stacking shoulder spaced from the rim, along with a loop-type carrying bail secured at opposed ends to opposite sides of the container body. A yoke element is provided for engaging the carrying bails of the penultimate and successively adjacent numbers of containers in the stack, so as to permit vertical separation of the lowermost container of the column from the remainder of the stack. Associated with the yoke element is a pair of cams which are adapted to engage the bail of the container, which is a predetermined number above the penultimate container in the vertical stack, to apply an inward compressive force thereto to preclude interference with the lowermost container during its separation from the remainder of the stack.

4 Claims, 7 Drawing Figures

BAIL SEPARATOR FOR NESTED CONTAINERS

BACKGROUND OF THE INVENTION

The present invention relates generally to an improved method and apparatus for the handling of superimposed stacked receptacles and more specifically to such a method and apparatus for handling of nested superimposed columns of stacked receptacles or containers wherein means are provided for controlling and positioning the carrying bails of the containers at the lower end of the stack so as to permit vertical separation and removal of the lowermost container of the vertical column or stack.

In the packaging of certain commodities, such as, for example, ice cream or the like, carrying containers or receptacles are provided for the convenient packaging of the product, as well as for convenient carrying or handling of the product by the consumer. Containers of this type are normally fabricated from polyethylene, composition board, or the like. These empty containers may be shaped so as to have a generally rectangular cross-section tapering toward a base to permit nesting of the empty containers, with the consequent conservation of storage volume for the empty containers.

Traditionally, these box-like containers have a base, an upper rim, and an outwardly projecting stacking shoulder which is formed along the periphery of the container body and at a location spaced from the upper rim. A generally "U"-shaped carrying bail is secured to opposed side walls of the container at opposed midway points and between the stacking shoulder and the upper rim. When free-hanging, the carrying bail will normally rest against the outer periphery of the body at a downwardly extending or declining angle. When in stacked or nested disposition, these carrying bails frequently interfere with the vertical separation of the bottom or lowermost container of the stack, the carrying bail of the penultimate or higher ordered container in the stack frequently becoming entangled with the upper rim of the lowermost container in the stack. The apparatus of the present invention provides means for controllably positioning the carrying bail of the penultimate and higher ordered containers in a stacked column of containers so as to permit controlled and orderly vertical separation of the lowermost container of the stack.

In my co-pending application, Ser. No. 768,776, filed Feb. 15, 1977, now U.S. Pat. No. 4,082,203 there is described a machine for sequentially depositing frustoconical containers from a stack onto a receiving surface which includes apparatus for ensuring that the bail of the penultimate container in the stack will not interfere with the separation of the lowermost container from the stack. While the machine of the aforereferenced co-pending application is entirely suitable for handling containers having a generally circular cross-section, it has been found to be somewhat unsatisfactory for handling rectangular cross-sectioned containers.

When containers of a rectangular cross-section are stacked, the "U"-shaped bail of a container higher up in the stack will frequently engage the outwardly extending rim of the lowermost container producing an effect known as "daisy chaining". It has been found that the bail orienting device of the aforereferenced application is incapable of obviating the daisy chaining problem in that the simple pivoting of the bail by a leg on the bail orienting mechanism merely serves to clamp a bail more firmly under the rim of the lowermost container.

SUMMARY OF THE INVENTION

Briefly, the apparatus of the present invention includes means for retaining a stacked column of superimposed or nested box-like containers, with means for controllably delivering individual containers from the stack to a receiving surface. Once on the receiving surface, the container is moved to a loading zone where it is filled with product. The filling means includes apparatus designed for interrupted feeding or dropping of product.

The container handling means includes a generally "U"-shaped yoke having plural pairs of laterally spaced legs which are arranged to straddle or otherwise receive containers therebetween. Means are provided for reciprocatorily moving the yoke along a generally horizontal path between forward and retracted dispositions. When in the forward disposition, the upper surface of at least one of the legs of the yoke engages the carrying bails of the penultimate container as well as those of a higher order in the stack, and pivot the engaged bails upwardly to a generally horizontal and non-interferring disposition. Associated with the pair of legs engaging the bail of a predetermined container in a superior order in the stack are a pair of cams which are adapted to engage the ends of the bail of this predetermined container as the yoke is moved from its retracted to its forward disposition. The cams exert an inward compressive force on opposed ends of the bail causing the rim engaging portion of the bail to bow outwardly so as to clear the rim of the lowermost container as the bail of the container in the predetermined superior position in the stack is pivoted upwardly, thereby permitting orderly vertical separation of the lowermost container from the vertical stack. Column support means are provided for intermittently supporting the lowermost container of the stack, and the same column support means, or alternately, the support means for the "U"-shaped yoke may be utilized for controllably lowering the elevation of the column by controlled incremental amounts. The magnitude of the drop is substantially equal to the normal vertical spacing between adjacent containers in the stack.

Therefore, it is a primary object of the present invention to provide an improved method and apparatus for the handling of superimposed stacked receptacles, particularly those receptacles having a generally rectangular cross-section configuration and being provided with a stacking shoulder and a carrying bail adjacent the upper rim portion thereof.

It is a further object of the present invention to provide an improved apparatus for the handling and delivering of individual box-like containers from a stacked column of such containers, wherein means are provided for controllably holding and retaining a stacked column of such containers in a form whereby the carrying bail is held out-of-contact with the body of the container, whereby the lowermost container of the stacked column may be controllably removed.

It is yet a further object of the present invention to provide an improved apparatus for the handling of box-like containers arranged in stacked disposition, the apparatus providing for means to controllably release the lowermost container from the stacked column during each operational cycle, the release occurring while the column is being supported by the bail orienting mechanism's engagement with the penultimate container of the stacked column, and with the lowermost container thereby being delivered to a container receiving surface for ultimate transfer of the released container to a product loading station.

It is a still further object of the invention to provide a means for inwardly compressing the opposed ends of the bail of a container occupying a predetermined position in the stack such that this bail will clear the rim of the lowermost container in the stack during the vertical drop thereof.

Other and further objects of the present invention will become apparent to those skilled in the art upon a study of the following specification, appended claims, and accompanying drawings.

DESCRIPTION OF THE PREFERRED EMBODIMENT

Figure 1:
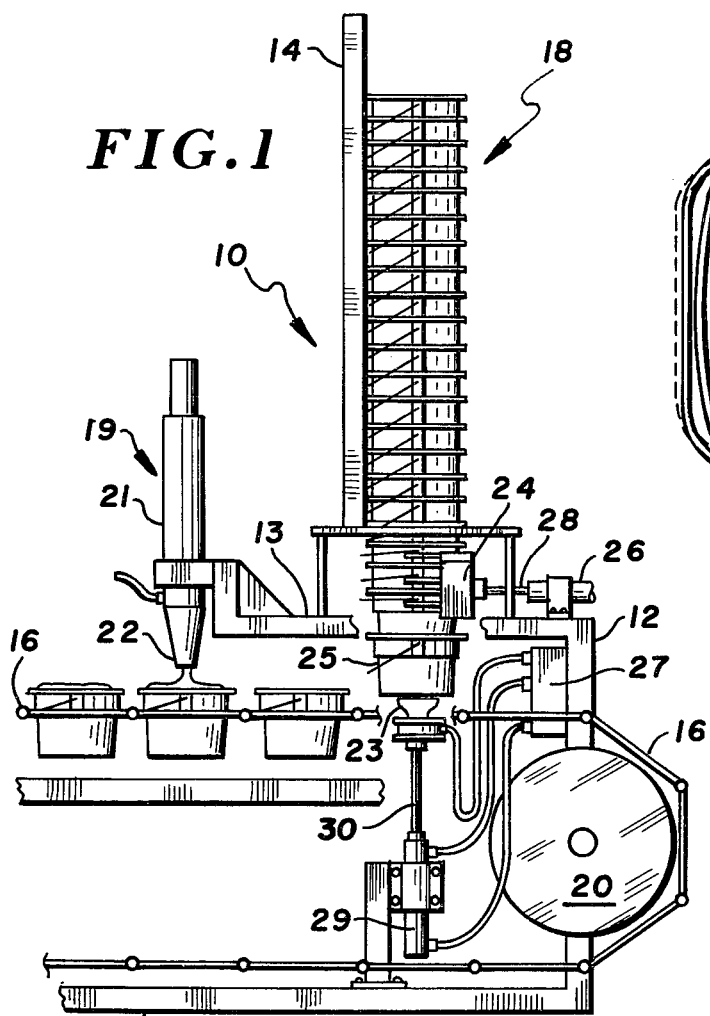
FIG. 1 is a side elevational view of a typical container handling apparatus, and illustrating a portion of a product filling conveyor in conjunction therewith.

Attention is initially directed to FIG. 1 of the drawings wherein the container handling apparatus generally designated 10 includes base frame elements 11, upright support posts 12 and container stack or column supporting members 13 and 14. A container conveyor is also illustrated, with conveyor flight 16 being provided for transporting the individual containers from the column or stack shown generally at 18 to the product filling station shown generally at 19. Drive sprocket 20 is utilized for providing motion to propel the conveyor, and specifically flight 16 as desired. In the illustration or embodiment illustrated, product is introduced from station 19 by means of the product injector element 21, having a discharge nozzle as illustrated at 22.

Container articulating devices are provided in the apparatus, particularly in connection with those portions or components of the apparatus shown in FIG. 1. Generally speaking, the stack is supported alternately by support cup 23 and bail yoke 24, as will be more fully explained hereinafter. Support cup 23 performs additional functions as well, including the function of controlling the downward motion of the stack or column 18, and the ultimate withdrawal or removal of the lowermost container from the stack, all of which will be more fully explained and detailed hereinafter.

In the disposition illustrated in FIG. 1, lowermost container such as container 25 is shown as it is about to enter the cavity or opening formed in flight 16 of the conveyor mechanism. As is apparent from the view of FIG. 1, support for the remaining containers of stack 18 is obtained from yoke member 24, with yoke 24 further controlling or maintaining the carrier bails in non-interferring relationship with the lowermost container, in this instance, container 25.

The disposition of the stack 18 as illustrated in FIG. 1 is retained until container 25 is disposed within the opening formed in flight 16, the retraction or lowering of support cup 23 continuing so as to permit flight 16 to index one position, thereby advancing the flight so as to permit raising of support cup 23 into contact with the then lowermost container member of stack 18. Cylinder 26 is then actuated by means of a valve in control 27, so as to retract rod 28, thereby permitting the entire stack 18 to rest upon support cup 23. In the next sequence, cylinder 29 is actuated by control 27 so as to effect a slight retraction of rod 30, thereby lowering cup 26 so as to permit re-advancing of rod 28 and consequently yoke 24 to intercept stack 18 at a point whereby the penultimate container in stack 18 will be engaged by yoke 24.

Figure 2:
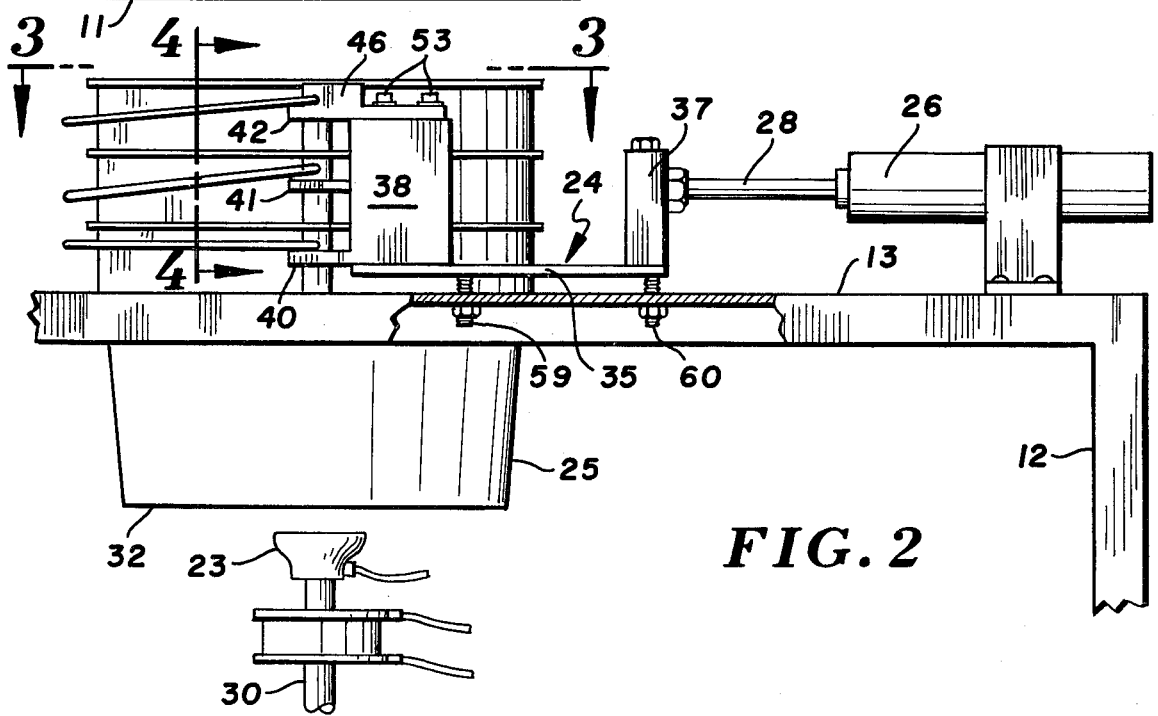
FIG. 2 is a side elevational view, on a slightly enlarged scale, and illustrating the details of certain of the container handling components, with this view being taken showing the stack being supported by the container handling yoke, with the stack about to become supported by a support cup adjacent the undersurface of the lowermost container in the stack.

Attention is now directed to FIG. 2 of the drawings wherein this sequence is being illustrated. Specifically, in FIG. 2, support cup 23 is advancing upwardly to engage lower surface 32 of the lowermost container in the stack, in this instance, container 25. Continued advancing of support cup 23 occurs until the arrangement is reached where container 25 is resting firmly on the support cup 23. Yoke 24 is then fully retracted, thus permitting the entire stack to rest solely on cup 23. This situation exits until the next sequence occurs, which is the advance of rod 28 from cylinder 26, thus causing yoke 24 to engage the penultimate container and a predetermined number of successively adjacent containers in the stack 18.

Further details of the operational sequence of the container handling machine may be obtained by reference to the co-pending application Ser. No. 768,776, filed Feb. 15, 1977, now U.S. Pat. No. 4,082,203.

Figure 3:
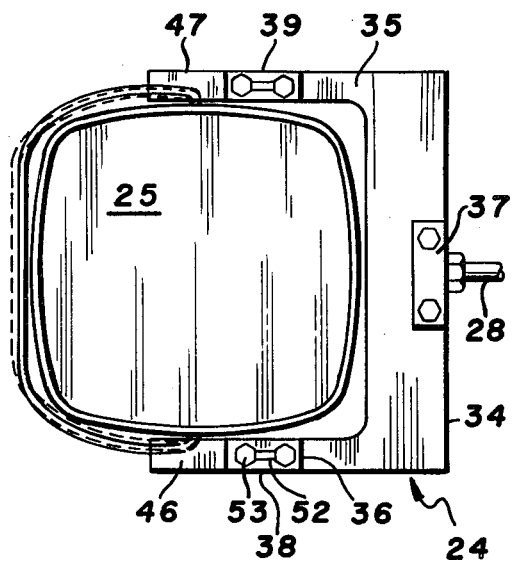
FIG. 3 is a sectional view taken along the line and in the direction of the arrows 3—3 of FIG. 2, and illustrating a top view of the container handling yoke.

With reference to FIGS. 2 and 3, it can be seen that the bail orienting mechanism indicated generally by numeral 24 comprises a "U"-shaped yoke member 34 having first and second legs 35 and 36 integrally formed therewith in a spaced apart relationship so as to staddle opposed sides of a container. Connected to the base 34 of the yoke 24 is a upwardly extending block 37 to which is fixedly attached the free end of the cylinder rod 28. A pair of finger blocks, as blocks 38 and 39, are attached to the yoke plate 34 proximate the ends of the legs 35 and 36, respectively.

Figure 4:
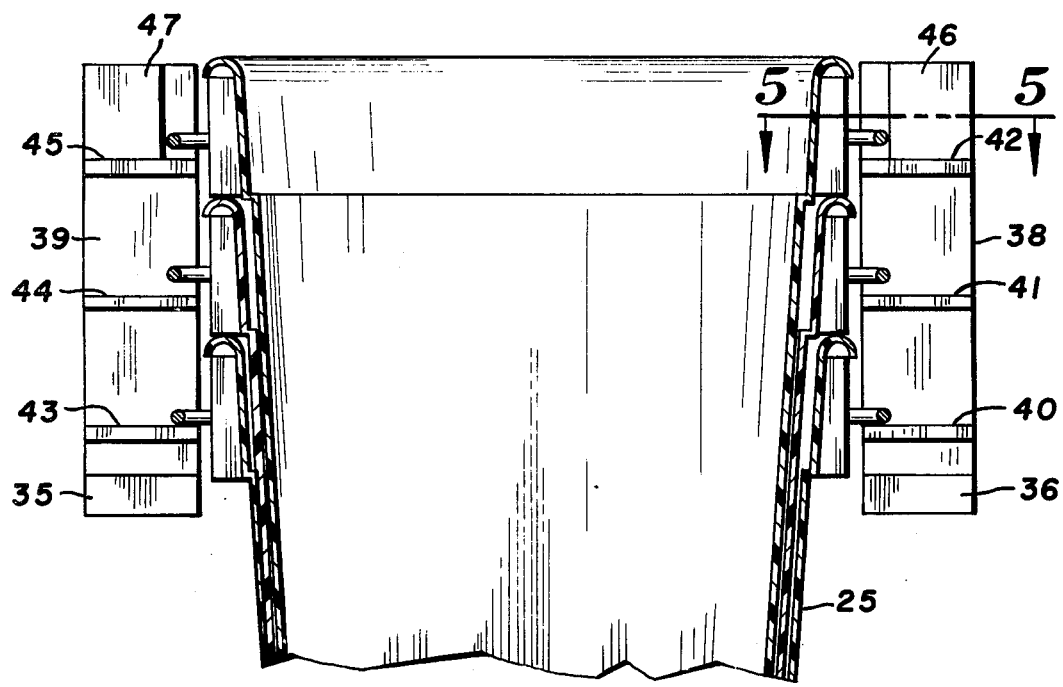
FIG. 4 is a slightly enlarged, side, cross-sectional view taken along the line 4—4 in FIG. 2 and illustrating the disposition of the cam arrangement.

As can best be seen from FIGS. 2 and 4, extending forwardly from each of the blocks 38 and 39 are a plurality of horizontal, spaced apart bail engaging fingers, including fingers 40, 41 and 42 on the block 38 and fingers 43, 44 and 45 on the block 39. When the bail orienting mechanism 24 is in its retracted position with the piston rod 28 contained within the cylinder 26, the fingers on the blocks 38 and 39 are out of engagement with the container bails and these bails are directed downwardly at an angle with the closed midportion thereof abutting the periphery of the containers. However, when the cylinder is actuated, the bail orienting mechanism 24 is moved forwardly such that the plural fingers on the blocks 38 and 39 engage the container carrying bails at points proximate their pivotal connection to the associated containers. The fingers cause the bails to be pivoted in a clockwise direction (when viewed in FIG. 2) so as to assume a generally horizontal disposition. It has been found, however, that when containers having a generally rectangular cross-section are being utilized in the stack unloading mechanism that when the bail orienting mechanism is in its retracted position, the bail of the container which is located at a predetermined position within the stack above the lowermost container, loops downward under the rim of the lowermost container and when the bail orienting mechanism is again moved to its extended position, the force applied to this bail by an associated finger only serves to more firmly lock that bail under the lip of the lowermost container to thereby prevent it from dropping free when the cup 23 is next retracted. This phenomena is termed "daisy chaining" and presents a serious problem as far as the smooth and reliable operation of the stack unloading machine is concerned.

In accordance with the teachings of the present invention, it has been found possible to obviate this daisy chaining problem by providing a means which is associated with the bail orienting fingers at a level in the stack above the bottom for applying an inwardly compressive force to the ends of the container bail at that disposition as the fingers engage that bail during the bail pivoting cycle of the machine. This inward compressive force causes the midportion of the affected bail to be bowed outwardly a sufficient distance to clear the lip or rim of the lowermost container in the stack. Thus, the bail engaging fingers are able to function to orient that bail in a generally horizontal disposition.

Figure 5:
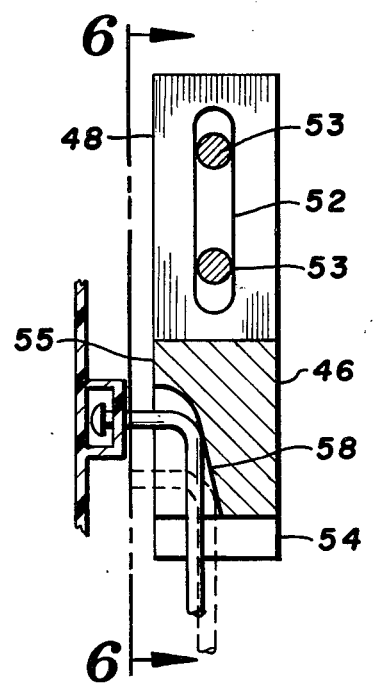
FIG. 5 is a detail cross-sectional view taken along the line 5—5 in FIG. 4 showing the cooperation between one cam and the bail which it engages.
Figure 6:
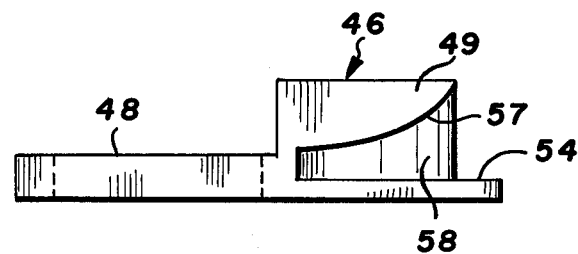
FIG. 6 is a side view of a cam utilized with the bail orienting mechanism in accordance with the present invention.
Figure 7:
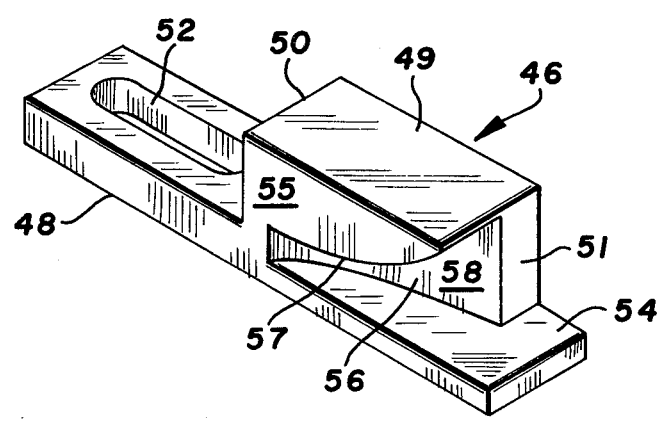
FIG. 7 is a perspective view of the cam of FIG. 6.

In order to carry out the invention, there is provided on the top surfaces of the blocks 38 and 39 cam members 46 and 47, the configuration of which can best be observed by reference to FIGS. 5, 6 and 7 of the drawings.

As is illustrated, the cam members each comprise a base portion 48 and an upwardly projecting block 49. The base 48 extends outwardly in both directions for predetermined distances beyond the ends 50 and 51 of the block 49 and a slotted aperture 52 is provided to allow lateral adjustment of the cam members 46 and 47 with respect to their mounting blocks 38 and 39, respectively. The bolts 53—53 provide a convenient means for adjustably attaching the cam members to their respective mounting blocks.

The portion 54 of the cam member 46 extending beyond the end surface 51 of the cam block 49 serves as a bail engaging finger when the cam member is properly affixed to its associated mounting block 38 or 39.

Formed in the inner side surface 55 of the cam block 49 is an arcuate shaped recess 56 which defines a cam profile. The recess 56 has a convex top surface 57 and a curved side surface 58 which is relatively wide at the edge surface 51 of the block 49, but which tapers smoothly along its length to the side surface 55.

As is apparent from the several views, as the bail orienting mechanism 24 is moved from its retracted position to its extended position, the bail engaging finger 54 of the cam member 46 will engage the bail of the container located a predetermined distance from the lowermost container in the stack and will tend to rotate that bail upward towards a horizontal disposition. As the bail orienting mechanism 24 is still further extended, the side surface 58 of the recess 56 will engage the end of the bail and, because of its tapered configuration, it will apply an increasing inwardly compressive force to the bail which it engages. As can best be seen from FIG. 3, this inwardly compressing force applied to opposed ends of the bail will cause it to bow outward a sufficient distance so that it will clear the rim or lip of the lowermost container, allowing the bail engaging finger surface 54 to completely rotate the bail to a horizontal disposition. As such, when the support cup 23 is retracted downward by means of the cylinder 29, the lowermost container will be free to drop into a opening in the conveyor 16 without interference.

With reference to FIG. 2, it can be seen that the elevation of the cam member 46 above the support frame 13 may be adjusted, within limits, by means of the height adjusting screws 59 and 60. This adjustment, along with the adjustments provided by the bolts 53 cooperating with the slots 52 formed in the cam members 46 and 47 allows the container unstacking machine to be used with a variety of container sizes.

While a preferred embodiment of the invention has been shown and described herein, it should be realized that there are many modifications, substitutions and alterations which may be made thereto which would fall within the scope of the following claims.

What is claimed is:

1. In a container delivering system for sequentially delivering individual containers from a nested stack, with said containers each having a generally rectangular cross-section body tapering toward a base, an upper outwardly extending rim and an outwardly projecting stacking shoulder formed along said body and spaced from said rim, and a generally semi-circular carrying bail secured to the periphery of said container at opposed sides thereof and along said body between said stacking shoulder and said upper rim and normally engaging the exterior of said body at an elevation between said stacking shoulder and the base thereof, of the type including stacking means for retaining a generally vertical column of said containers in nested relationship, means for intermittently delivering the lowermost container in said column onto a receiving surface, and a reciprocating bail orienting means for moving the bails associated with the penultimate and a predetermined number of other containers in succeedingly adjacent order in said column to a generally parallel disposition with respect to said receiving surface, the improvement comprising:
    (a) means connected to said bail orienting means for applying an inward compressive force to the bail of one container which is a predetermined number above said penultimate container in said column.

2. Apparatus as in claim 1 wherein said last mentioned means comprises first and second cams secured to said bail orienting means and having a cam profile adapted to slidingly engage said bail of said one container proximate the points of connection of the bail to said one container during a predetermined portion of the travel of said bail orienting means.

3. Apparatus as in claim 1 wherein said bail orienting means comprises:
    (a) a container straddling yoke element having a generally "U"-shaped head with a plurality of pairs of laterally spaced legs arranged to receive a container therebetween and having means for reciprocatorily moving said head along a generally horizontal path between forward and retracted dispositions;
    (b) the container engaging surface of said "U"-shaped head being normally disposed along a plane spaced from said container receiving surface by a distance greater than the height of said container and having said plurality of pairs of legs arranged to engage said bails of said penultimate and predetermined number of successively adjacent containers for pivoting said bails upwardly to a generally horizontal disposition for permitting vertical separation of the lowermost container of said generally vertical column.

4. Apparatus as in claim 3 and further including:
 (a) first and second cams individually affixed to the one pair of said plurality of pairs of legs engaging the one container which is a predetermined number above said lowermost container, said first and second cams providing an inward compressive force to the end portions of the bail on said one container during the pivoting upward travel thereof.